(No Model.)

J. A. ALEXANDER.
VEHICLE STEP.

No. 493,373. Patented Mar. 14, 1893.

Witnesses
C. A. Ford
N. F. Riley

Inventor
John A. Alexander.

By his Attorneys,
C. A. Snow & Co.

UNITED STATES PATENT OFFICE.

JOHN A. ALEXANDER, OF ARDMORE, INDIAN TERRITORY, ASSIGNOR OF ONE-HALF TO JOHN M. ALEXANDER, OF SAME PLACE.

VEHICLE-STEP.

SPECIFICATION forming part of Letters Patent No. 493,373, dated March 14, 1893.

Application filed October 13, 1892. Serial No. 448,739. (No model.)

*To all whom it may concern:*

Be it known that I, JOHN A. ALEXANDER, a citizen of the United States, residing at Ardmore, in the Chickasaw Nation, Indian Territory, have invented a new and useful Vehicle-Step, of which the following is a specification.

The invention relates to improvements in vehicle steps.

The object of the present invention is to provide a folding step for vehicles which may be readily let down to enable a person to readily ascend and enter a wagon or the like, and which when not in use may be readily folded up out of the way.

The invention consists in the construction and novel combination and arrangement of parts hereinafter fully described, illustrated in the accompanying drawings and pointed out in the claims hereto appended.

Figure 1:
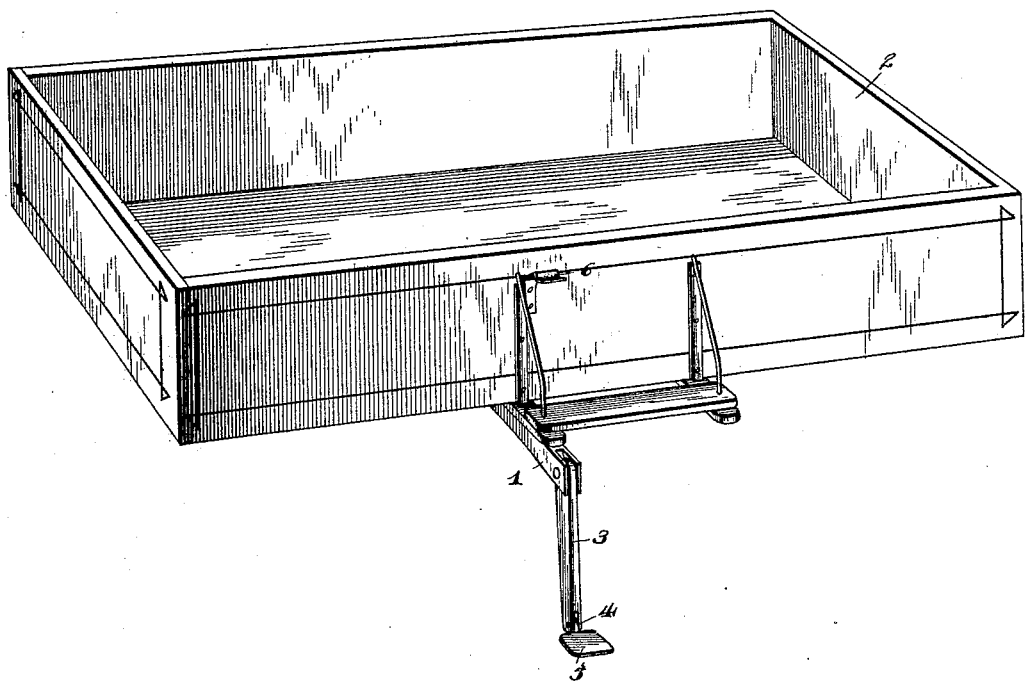
Figure 2:
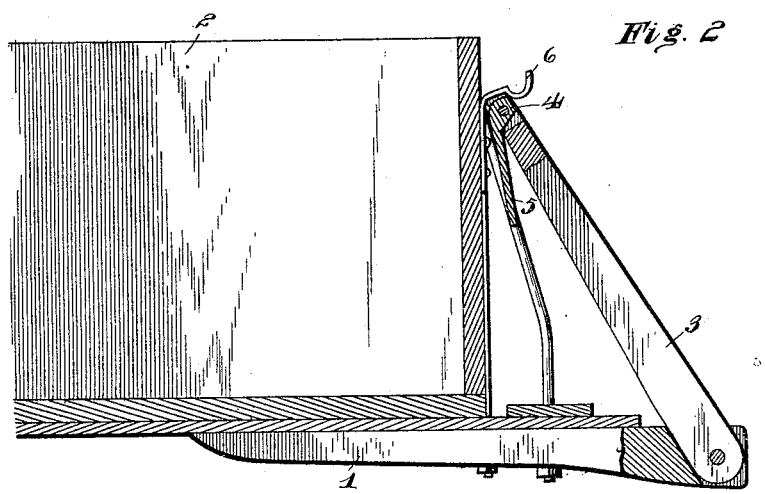

In the drawings—Figure 1 is a perspective view of a vehicle provided with a step constructed in accordance with this invention. Fig. 2 is a vertical sectional view the step being folded.

Like numerals of reference indicate corresponding parts in both the figures of the drawings.

1 designates a horizontal bar which is bolted to the lower face of one of the transverse pieces of a brake-sleeper of a body 2, and thereby secured to the latter; and it projects laterally from the body 2 and has its outer end bifurcated and it receives in its bifurcation the upper end of a riser bar 3. The upper end of the riser bar is pivoted in the bifurcation of the horizontal bars, and its lower end is bifurcated and has pivoted in the bifurcation a shank 4 of a foot plate 5.

In Fig. 1 of the accompanying drawings the folding step is shown lowered and is adapted to enable anyone to enter the body, and when it is not in use it is folded as shown in Fig. 2. The folding step is secured in its folded position by a spring catch 6 consisting of a resilient plate secured to one side of the body and bent outward to form a shoulder to receive the bifurcated end of the riser bar, and bent upward to form a lip to enable it to be readily disengaged from the folding step to release the latter.

It will be seen that the folding step is simple, inexpensive, strong and durable, that it may be readily applied to a vehicle, and that when it is not in use it may be folded out of the way.

Changes in the form, proportion, and the minor details of construction may be resorted to without departing from the principle or sacrificing any of the advantages of this invention.

What I claim is—

1. The combination with a wagon body, of a horizontal bar secured to the lower face thereof and projecting laterally therefrom, a riser bar pivoted to the outer end of the horizontal bar and adapted to be folded against the side of the body, a foot plate pivoted to the lower end of the riser bar, and a spring catch secured to the side of the body and consisting of a resilient plate having a shoulder to engage the riser bar, substantially as described.

2. The horizontal bar secured to the wagon-body, the riser-bar 3 pivoted to the bar, a foot-plate pivoted to the end of the riser-bar, and a catch 6, substantially as described.

In testimony that I claim the foregoing as my own I have hereto affixed my signature in the presence of two witnesses.

JOHN A. ALEXANDER.

Witnesses:
W. B. JOHNSON,
LEE CRUCE.